UNITED STATES PATENT OFFICE.

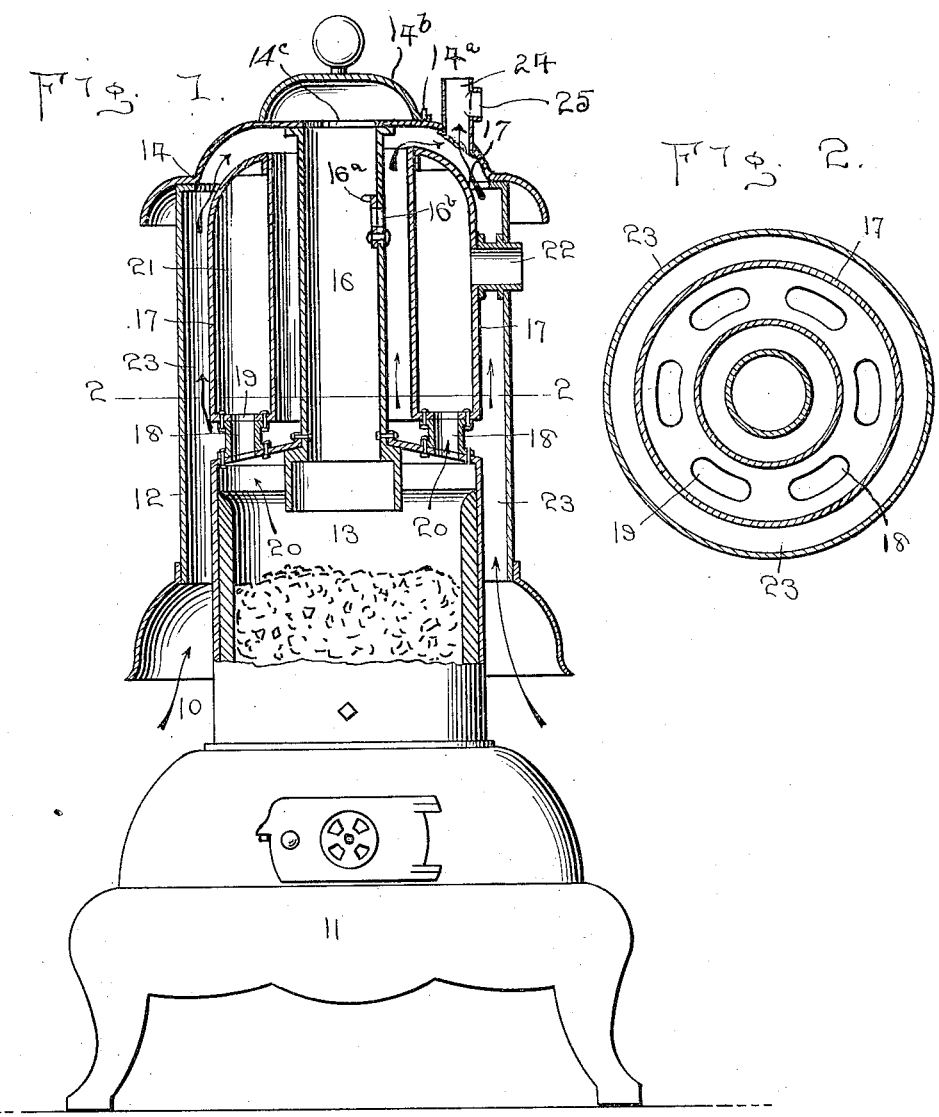

JACOB K. MOHLER, OF EPHRATA, PENNSYLVANIA.

STOVE.

1,139,211.     Specification of Letters Patent.     Patented May 11, 1915.

Application filed May 28, 1912. Serial No. 700,301.

*To all whom it may concern:*

Be it known that I, JACOB K. MOHLER, a citizen of the United States, residing at Ephrata, in the county of Lancaster and State of Pennsylvania, have invented certain new and useful Improvements in Stoves; and I do hereby declare the following to be a full, clear, and exact description of the invention, such as will enable others skilled in the art to which it appertains to make and use the same.

The invention relates to stoves and has for an object to provide a heating stove whereby a greater heating surface is obtained and a corresponding large amount of heat is secured.

For the purpose mentioned, use is made of a drum disposed in the shell of a stove to partition the heating chamber thereof, the said drum being connected to the fire pot to act as an exhaust flue for gases of combustion, thus providing a construction whereby the air entering the heating chamber passes around both sides of the drum and is very easily heated.

Reference is to be had to the accompanying drawings constituting a part of this application in which similar characters of reference denote the corresponding parts in the above device in which—

Figure 1 is a side elevation of a stove with the upper portion thereof longitudinally sectioned to disclose the underlying structure; and Fig. 2 is a sectional view taken on the line 2—2 of Fig. 1.

Referring more particularly to the device, I employ a stove 10 supported upon a base 11, an outer shell 12 and a fire pot 13 extending into the shell 12. Secured within an opening in the roof of the fire pot 13 is the fuel feeding tube 16 which has secured upon its upper end the top 14, secured to the shell 12. Pivoted on the inside of the fuel feeding tube 16 is a suitable damper plate 16$^a$ having an opening therein adapted to be moved into registration with the opening 16$^b$ in the fuel feeding tube.

The top 14 of the shell 12 is provided with an upstanding integral lug 14$^a$ to which is pivoted the removable top plate 14$^b$ for covering the fuel feeding opening 14$^c$ in said top. Positioned within the top 14 is an outlet pipe 24 through which the heated air is adapted to pass, and to the short extension of which may be secured a pipe (not shown) for conducting the heated air to adjacent rooms.

A circular drum 17 is disposed in the shell 12, with spaced flues 18 connecting the fire pot 13 with the drum 17, suitable apertures 19 being formed in the drum 17 to aline with the apertures 20 in the fire pot 13. The drum 17 forms a flue chamber 21 having connected thereto a vent flue 22 for connection with the chimney or the like, and the said drum is spaced from the fuel feeding tube 16 and shell 12 to constitute a heating medium in a heating chamber 23 intermediate the shell 12 and the fuel tube 16. The drum 17 is so placed in the shell 12 that any air entering the shell at the lower end thereof is divided to pass around both sides of the drum and become heated. Inasmuch as a large amount of heat passes from the fire pot 13 into the flue chamber 21 in the drum 17, by dividing the heat as mentioned, a portion of the air to be heated will pass upwardly between the inner wall of the drum and the flue tube 16, which also becomes heated, and the remainder of said air will pass upwardly between the outer wall of the drum and the outer shell, thus providing an increased heating surface capable of heating a larger amount of air in a shorter time than the heating stoves now generally used.

What I claim is:—

A stove comprising; a casing, a top member supporting said casing, a fuel feeding tube supporting said top member, said fuel feeding tube having an enlarged lower portion, and a fire pot having a central aperture with an upturned flange therearound supporting said fuel feeding tube, said enlarged portion of said fuel feeding tube projecting into said fire pot, and said enlarged portion of said fuel feeding tube and said upturned flange combining to form a reinforcing joint and to prevent warping.

In testimony whereof I have signed my name to this specification in the presence of two subscribing witnesses.

JACOB K. MOHLER.

Witnesses:
F. E. ENGLE,
LAURA B. ENGLE.